US012554125B2

(12) United States Patent
Solgaard et al.

(10) Patent No.: US 12,554,125 B2
(45) Date of Patent: Feb. 17, 2026

(54) DOUBLY RESONANT MICROMECHANICAL BEAM SCANNERS

(71) Applicant: The Board of Trustees of the Leland Stanford Junior University, Stanford, CA (US)

(72) Inventors: Olav Solgaard, Stanford, CA (US); Jennifer Solgaard, Stanford, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 425 days.

(21) Appl. No.: 18/024,146

(22) PCT Filed: Aug. 23, 2021

(86) PCT No.: PCT/US2021/047090
§ 371 (c)(1),
(2) Date: Mar. 1, 2023

(87) PCT Pub. No.: WO2022/051123
PCT Pub. Date: Mar. 10, 2022

(65) Prior Publication Data
US 2023/0266581 A1 Aug. 24, 2023

Related U.S. Application Data

(60) Provisional application No. 63/073,755, filed on Sep. 2, 2020.

(51) Int. Cl.
*G02B 26/08* (2006.01)
*G01S 7/481* (2006.01)
*G02B 26/10* (2006.01)

(52) U.S. Cl.
CPC .......... *G02B 26/101* (2013.01); *G01S 7/4817* (2013.01); *G02B 26/0833* (2013.01)

(58) Field of Classification Search
CPC . G02B 26/101; G02B 26/0833; G01S 7/4817; B33Y 80/00
See application file for complete search history.

(56) References Cited

U.S. PATENT DOCUMENTS

| 9,003,882 B1 | 4/2015 | Ayazi et al. |
| 2006/0152106 A1 | 7/2006 | Yan et al. |
| 2016/0109652 A1 | 4/2016 | Schowengerdt |
| 2018/0113200 A1* | 4/2018 | Steinberg ............... G08G 1/166 |

OTHER PUBLICATIONS

Authorized Officer: Kari Rodriquez, International Search Report and Written Opinion issued in PCT application No. PCT/US2021/047090, Nov. 8, 2021, 13 pp.

* cited by examiner

*Primary Examiner* — Euncha P Cherry
(74) *Attorney, Agent, or Firm* — Kaplan Breyer Schwarz LLP

(57) ABSTRACT

The present disclosure is directed toward systems and methods for steering a light beam within a field of view with better uniformity and/or density than achievable using prior art beam scanners. Beam scanners in accordance with the present disclosure include an optical element that is operatively coupled with doubly resonant tethers that enable motion of the optical element in at least one dimension, thereby enabling the beam scanner to realize scan patterns that are more complex than simple Lissajous curves. In some embodiments, doubly resonant beam scanners can steer a light beam in a Rose pattern, a combined Rose and Lissajous pattern, or more complex patterns.

15 Claims, 10 Drawing Sheets

FIG. 1B sectional view through a-a

DOUBLY RESONANT MICROMECHANICAL BEAM SCANNERS

CROSS-REFERENCE TO RELATED APPLICATIONS

This case claims priority of U.S. Provisional Patent Application Ser. No. 63/073,755, filed Sep. 2, 2020, which is incorporated herein by reference. If there are any contradictions or inconsistencies in language between this application and one or more of the cases that have been incorporated by reference that might affect the interpretation of the claims in this case, the claims in this case should be interpreted to be consistent with the language in this case.

TECHNICAL FIELD

The present disclosure relates to beam scanning in general, and, more particularly, to micromechanical scanning systems, such as scanning mirrors and lens scanners, for directing an optical beam in two dimensions.

BACKGROUND

The ability to scan an optical beam, such as a laser beam, over a field-of view (FOV) is important in many applications, including laser microscopy, environmental monitoring, and LiDAR. It is desirable in many of these applications to scan the optical beam via a small, low-cost, mirror-based scanner capable of two-dimensional scanning with a large FOV, fast scanning capability, and uniform fill factor. Unfortunately, these requirements are often conflicting and, as a result, engineering compromises are typically required.

One well-known approach for scanning a micromirror to achieve a large FOV is Lissajous scanning, in which a Lissajous pattern is produced by driving each axis of a two-axis scanner (or a pair of orthogonally oriented single-axis scanners) on resonance. Unfortunately, Lissajous scanning leads to over-sampling of the edges of the scan region (particularly its corners) and under sampling of its center, which is undesirable for many applications, such as those that require scanning with substantially uniform fill factor or oversampling of the center of the scan region.

The need for a simple, low-cost approach to scanning an optical beam over a large scan region without oversampling at its corners, with the capability of oversampling in its center remains, as yet, unmet in the prior-art.

SUMMARY

Systems and methods for scanning an optical beam over a large scan region using one- and two-dimensional Rhodonea-curve scans are presented. Beam scanners, such as scanning mirrors, lens scanners, and the like, in accordance with the present disclosure are configured for doubly resonant operation on two orthogonal axes to realize scan patterns that enable:
  i. oversampling in the center of the scan region; or
  ii. avoid oversampling at the corners of the scan region; or
  iii. allow tuning of the sampling density across the field of view of the scan region; or
  iv. any combination of i, ii, and iii.

Like the prior art, the present disclosure teaches steering an optical beam over a scan region by redirecting the beam via a MEMS-based scanning platform that is driven on-resonance in at least one axis.

In sharp contrast to the prior art, embodiments in accordance with the present disclosure drive at least one axis of a scanning platform with a drive signal having two resonances to enable scanning the optical beam over a scan region with a pattern based at least partially on the Rhodonea pattern. Beam scanners in accordance with the present disclosure are particularly well suited for use in LiDAR systems, head-mounted displays, and the like.

An illustrative embodiment of the present disclosure is a scanning system that includes a two-axis micromechanical scanner mechanically coupled with a mirror to collectively define a micromirror configured to redirect an optical beam over a scan region with a large FOV. The micromirror is dimensioned and arranged such that it is doubly resonant in each of its rotation axes. Each axis of the micromirror is driven with a harmonic drive signal having two resonance frequencies whose ratio is approximately 2. As a result, the micromirror scans the optical beam over the scan region in a Rhodonea pattern that oversamples the central portion of the scan region as compared to its outer edges.

In some embodiments, the scanning platform is mechanically coupled with an optical element other than a mirror, such as a lens, prism, diffraction grating, and the like, for redirecting the propagation direction of an optical beam.

In some embodiments, the ratio of the resonance frequencies used to drive an axis of a micromirror is another resonance frequency within the range from approximately 3 to approximately zero.

In some embodiments, a scanning platform has tethers that are configured to establish a pair of desired resonances for a driven axis. In some embodiments, the desired resonances of the tethers are established by controlling its stiffness along its length. In some embodiments, localized stiffness is controlled by controlling localized tether thickness and/or width.

In some embodiments, each axis of a scanning platform is driven with drive signals having substantially the same frequency. In some embodiments, the axes are driven with drive signals that have different frequencies. In some embodiments, at least one axis is driven with a first drive signal having a higher resonance frequency and the other axis is driven with a second drive signal having a lower resonance frequency, where the first drive signal is in the flat band of the second drive signal. In some embodiments, at least one frequency of a drive signal applied to at least one axis is not at a resonance frequency of that axis.

In some embodiments, an optical beam is directed over a scan region in a different pattern, such as a modified-Rhodonea pattern, a modified Lissajous pattern, and combinations of Rhodonea and Lissajous patterns.

An embodiment in accordance with the present disclosure is an apparatus comprising a beam scanner (100) for steering a light beam (118) in a pattern (400 or 600), wherein the beam scanner includes: first and second tethers (112X) that are doubly resonant; a stage (108) that is mechanically coupled between the first and second tethers; and an optical element (104) configured to direct the light beam, wherein the optical element is mechanically coupled with the stage; wherein the first and second tethers collectively enable a first motion of the stage, the first motion being selected from the group consisting of a rotation about a first axis (x axis) and a translation along a second axis (y axis) that is orthogonal to the first axis.

Another embodiment in accordance with the present disclosure is a method for steering a light beam (118) in a pattern (400 or 600), the method comprising: providing a beam scanner (100) that includes; (i) first and second tethers (112X) that are doubly resonant such that they are characterized by a first pair of resonances (R1X and R2X); (ii) a stage (108) that is mechanically coupled between the first and second tethers; (iii) an optical element (104) that is configured to direct the light beam, wherein the optical element is mechanically coupled with the stage; and (iv) an actuator that is configured to impart a first motion on the scanning platform, wherein the first motion is selected from the group consisting of a rotation about a first axis (x axis) and a translation along a second axis (y axis); establishing a first pair of frequencies (F1X and F2X) that are based on the first pair of resonances; driving the actuator with a first drive signal (DSX) that includes the first pair of frequencies; and receiving the light beam at the optical element.

Yet another embodiment in accordance with the present disclosure is a Light Detection and Ranging (LiDAR) system comprising a beam scanner (100), a receiver (1102), and a processor (1104), wherein the beam scanner includes a two-dimensional scanning platform (102) comprising doubly resonant tethers that enable rotation of a mirror (104) about each of two orthogonal doubly resonant axes to steer a light beam (118) in a two-dimensional Rose pattern within a field of view.

BRIEF DESCRIPTION OF THE DRAWINGS

FIGS. 1A-B depict schematic drawing of plan and sectional views, respectively of a doubly resonant scanner in accordance with the present disclosure.

DETAILED DESCRIPTION

Figure 1A:
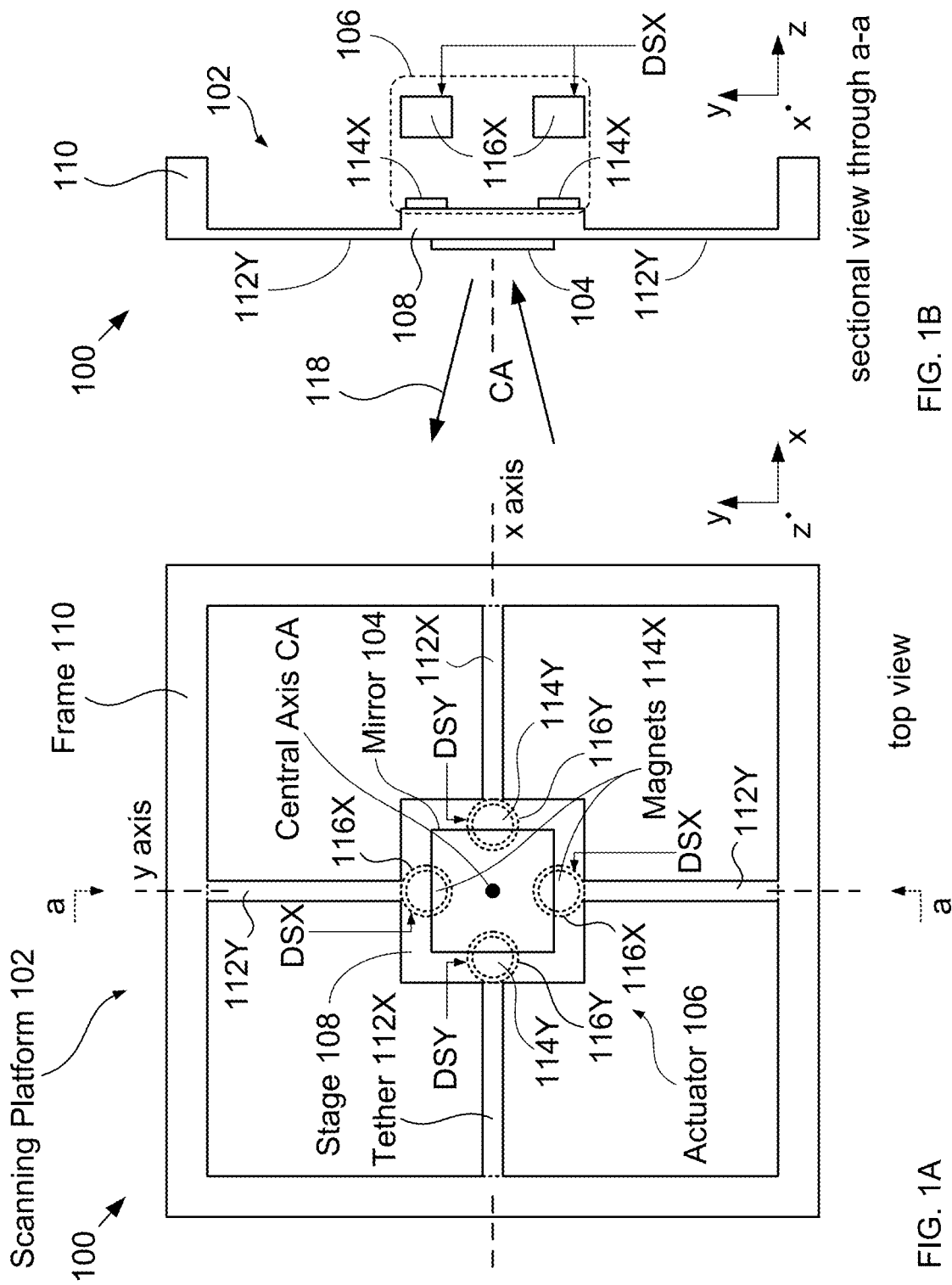

FIGS. 1A-B depict schematic drawing of plan and sectional views, respectively of a doubly resonant scanner in accordance with the present disclosure. Beam scanner 100 includes scanning platform 102, mirror 104, and actuator 106. Beam scanner 100 is operative for redirecting light beam 118 and steering it in two dimensions.

Figure 2:
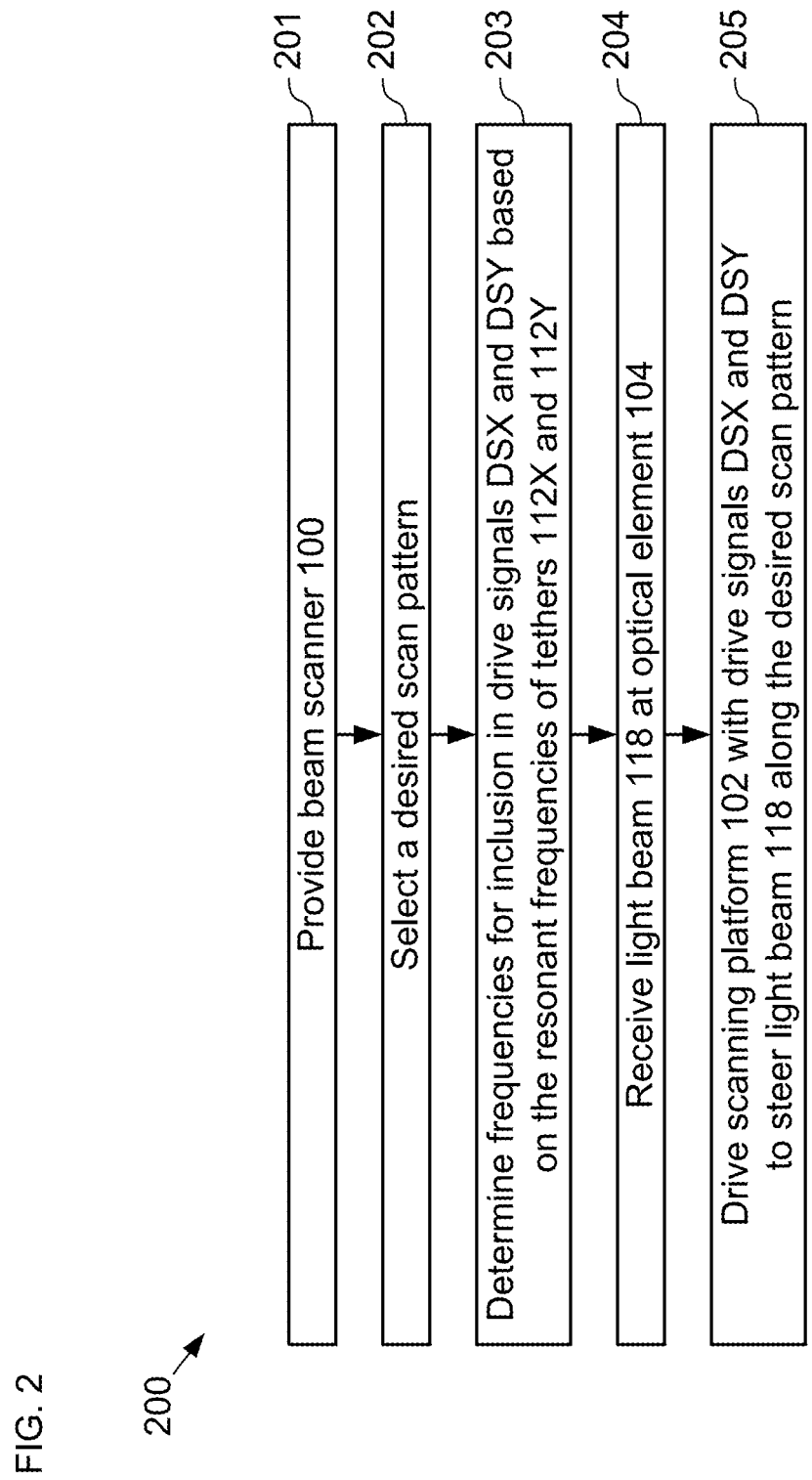
FIG. 2 depicts operations of a method suitable for scanning a light signal in accordance with the present disclosure.

FIG. 2 depicts operations of a method suitable for scanning a light signal in accordance with the present disclosure. Method 200 begins with operation 201, wherein beam scanner 100 is provided.

Scanning platform 102 comprises stage 108, frame 110, and tethers 112X and 112Y. Stage 108 is suspended from frame 110 by tethers 112X and 112Y (referred to, collectively, as tethers 112). Tethers 112X collectively enable rotation of stage 108 about the x axis. In similar fashion, tethers 112Y collectively enable rotation of stage 108 about the y axis. Each of tethers 112X and 112Y are doubly resonant. For the purposes of this Specification, including the appended claims, the term "doubly resonant" is defined as meaning being characterized by a pair of fundamental resonant frequencies (i.e., resonances). In the depicted example, scanning platform 102 is a four-fold rotationally symmetric system having degenerate resonances in two orthogonal directions (i.e., the x- and y-directions). In some embodiments, tethers 112X are characterized by a first pair of resonances, while tethers 112Y are characterized by a second pair of resonances, at least one of which is different than those of tethers 112X.

In the depicted example, scanning platform 102 is a two-axis micromechanical scanning system. In some embodiments, scanning platform is a micromechanical system formed in conventional fashion using techniques other than those known in micromechanical systems fabrication. Fabrication technologies suitable for forming scanning platform 102 include, without limitation:
  i. fabrication techniques used for the formation of Micro Electro Mechanical Systems (MEMS); or
  ii. planar processing; or
  iii. three-dimensional (3D) printing; or
  iv. hand assembly; or
  v. hybrid fabrication techniques in which some features of a scanning system are formed on different substrates and joined after-the-fact; or
  vi. any combination of i, ii, iii, iv, and v.

Each of stage 108, frame 110, and tethers 112 comprises structural material suitable use in accordance with the present disclosure. In some embodiments, they comprise a structural material suitable for use in conventional micromechanical systems. In the depicted example, the structural material is silicon; however, myriad alternative structural materials suitable for use in accordance with this disclosure would be apparent to one skilled in the art after reading this Specification. Furthermore, in some embodiments, stage 108, frame 110, and tethers 112 comprise one or more different structural materials, such as plastics, ceramics, metals, composites, and the like.

Stage 108 is a substantially structurally rigid platform on which an optical element can be mounted. Stage 108 resides above a substrate (not shown) with sufficient separation from the substrate to enable a desired range of rotation about each of the x- and y-axes.

Frame 110 is a structurally rigid frame that is attached to the substrate such that the frame functions as a substantially immovable anchor for stage 108.

Each of tethers 112 is configured to suspend stage 108 above the substrate and enable it to move in response to one or more forces generated by actuator 106. The tethers are configured such that the x axis is characterized by a pair of resonances, R1X and R2X, having a first desired ratio. In similar fashion, the y axis is characterized by a pair of resonances, R1Y and R2Y, having a second desired ratio.

The dual-resonance configuration of tethers 112 enables doubly resonant scanning operation for beam scanner 100. Tethers 112 are described in more detail below and with respect to FIGS. 3A-B.

Mirror 104 is a conventional planar mirror disposed on stage 110. In some embodiments, mirror 104 is a different optical element suitable for redirecting an optical beam. Optical elements suitable for use in accordance with the present disclosure include, without limitation, prisms, diffractive elements, holograms, and the like.

Actuator 106 is an electromagnetic actuator that includes permanent magnets 114X and 114Y (referred to, collectively, as magnets 114) and electromagnets 116X and 116Y (referred to, collectively, as electromagnets 116). Magnets 114 are mounted to the bottom surface of stage 108 and arranged such that electromagnets 116 can impart attractive and repulsive forces on them when energized with the appropriate current flow via drive signals DSX and DSY. As a result, electromagnets 116X can pull and push permanent magnets 114X to induce rotation of stage 108 about the x-axis, while electromagnets 116Y can pull and push permanent magnets 114Y to induce rotation of stage 108 about the y-axis. In some embodiments, only one electromagnet for each scanning direction is included.

It should be noted that, although beam scanner 100 includes a magnetic actuator configured to rotate stage 108 about two axes, embodiments in accordance with the present disclosure can include actuators other than two-axis magnetic actuators, such as electrostatic actuators, magnetostrictive actuators, thermal actuators, piezoelectric actuators, and the like. Furthermore, some beam scanners in accordance with the present disclosure are configured to rotate a stage about only one axis.

Figure 3A:
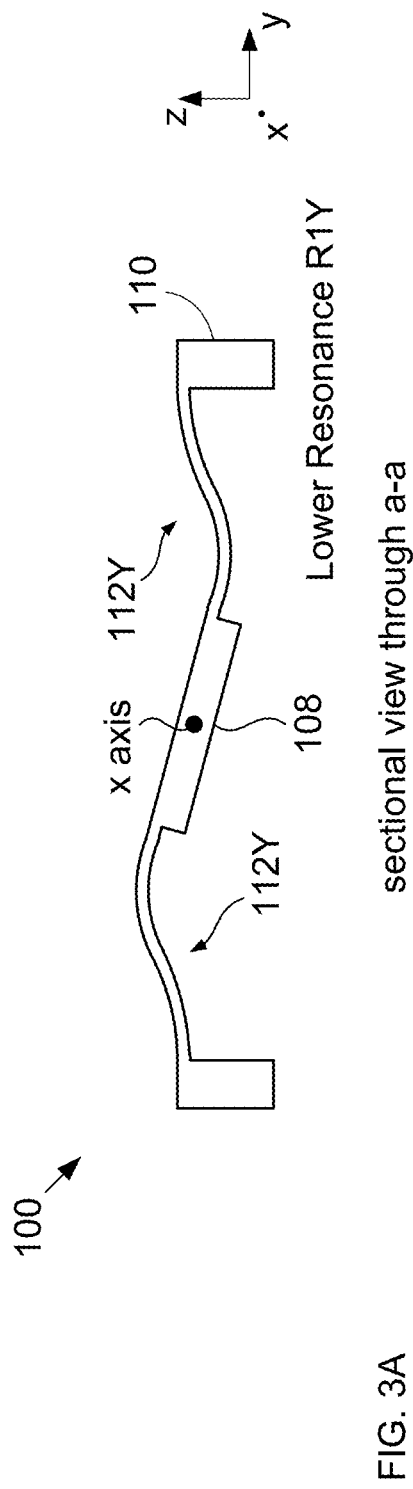
FIGS. 3A-B depict schematic drawings of a sectional view of scanning platform 100 in different states of resonance in accordance with the present disclosure.
Figure 3B:
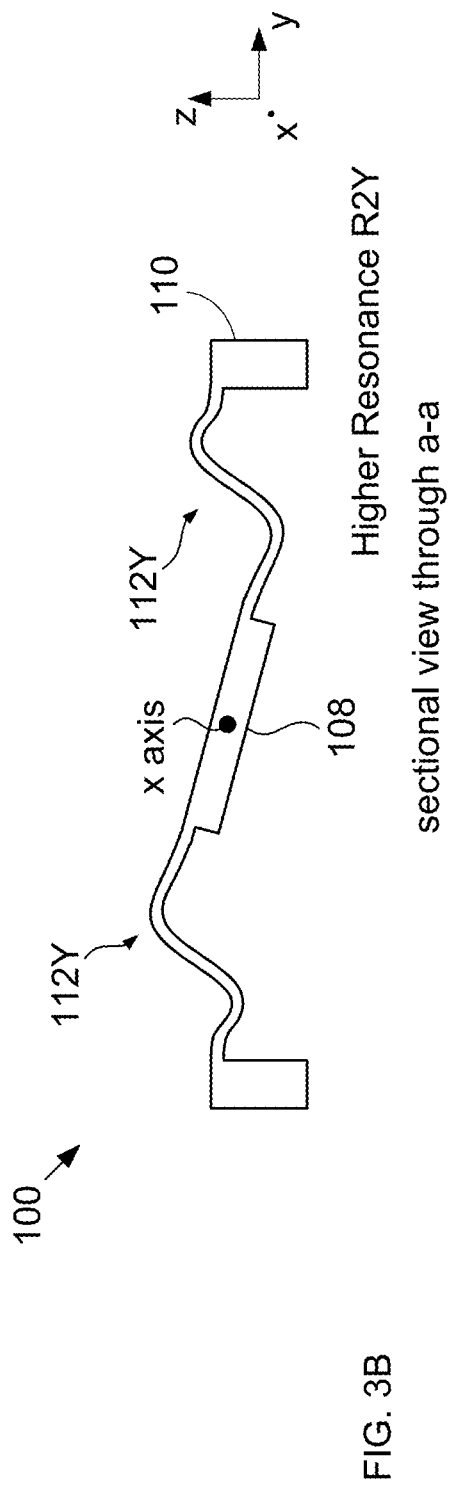

FIGS. 3A-B depict schematic drawings of a sectional view of scanning platform 100 in different states of resonance in accordance with the present disclosure. The view of scanning platform 100 in FIGS. 3A-B is taken through line a-a as shown in FIG. 1A.

In the depicted example, each rotation axis has the same two resonances, R1 and R2 (i.e., R1X=R1Y=R1 and R2X=R2Y=R2). As seen from FIGS. 3A-B, R1 is a relatively lower-order resonance that manifests as a nonlinear shape having two inflection points along the length of tethers 112Y. R2 is a relatively higher-order resonance frequency that manifests as a nonlinear shape having three inflection points along the length of the tethers. As will be apparent to one skilled in the art, after reading this Specification, more force is required to bring tethers 112Y into the shape shown in FIG. 3B.

In some embodiments, at least one of tethers 112 is characterized by a different pair of resonances. For example, in some embodiments, tethers 112X are configured to give rise to at least one resonance for the x axis that is different from the resonances of the y axis.

It is an aspect of the present disclosure that a desired ratio of resonances can be provided the tethers of a scanning platform by configuring the stiffness of the tethers along their length such that they bend differently for two resonant modes. In some embodiments, a desired stiffness profile along the length of a tether is realized by:
 i. controlling the thickness of the tether along its length; or
 ii. controlling the width of the tether along its length; or
 iii. altering the material composition of the tether along its length; or
 iv. any combination of i, ii, and iii.

When driven at resonance frequencies R1 and R2, the movement of scanning platform 102 (and, therefore, mirror 104) becomes more pronounced and beam scanner 100 steers light beam 118 in a two-dimensional pattern in space.

It should be noted that a beam scanner comprising doubly resonant tethers in each axis, when driven in each axis using drive signals having appropriate frequencies, can give rise to a two-dimensional scan pattern defined by a rose pattern. In many applications, a beam scanner capable of creating a "rose" scanning pattern offers significant advantages over beam scanners of the prior art.

At operation 202, a desired scan pattern for light beam 118 is selected.

Doubly resonant beam scanners in accordance with the present disclosure enable generation of scan patterns that are not typically possible using beam scanners known in the prior art. One such scan pattern is a "Rose pattern" or "Rose curve." A Rose pattern advantageously fills a field of view faster and more evenly than other scan patterns, such as a Lissajous scan. Rose curves can also fill a circular FOV, which is often a better match to commercial optics than rectangular FOVs. Furthermore, a rotating Rose curve oversamples at the center of a FOV, which is in exact opposition to a Lissajous scan that oversamples the edges and corners of the FOV. By passing through the center, or close to it, twice in every cycle, a Rose scan enables rapid realignment of the center of the FOV, which is particularly attractive in dynamic-imaging modalities, such as LIDAR.

Rhodonea (Rose) Curves:

Rhodonea curves are 2D curves that under certain conditions resemble a flower, so they also go under the name of Rose curves. Mathematically, Rhodonea curves are most commonly expressed in their polar form:

$$r = A\cos(B\theta + C) \tag{1}$$

where A is the maximum distance of the graph from the origin and B is an integer that determines the number of 'petals'. If B is even, there will be 2B petals; otherwise there will be B petals. The parameter B can also be chosen to have a value that is not an integer. The parameter C corresponds to the phase shift. Changing the phase shift value rotates the rose around the origin. As we will see below, rotation can also be achieved by choosing a non-integer value for B.

Figure 4:
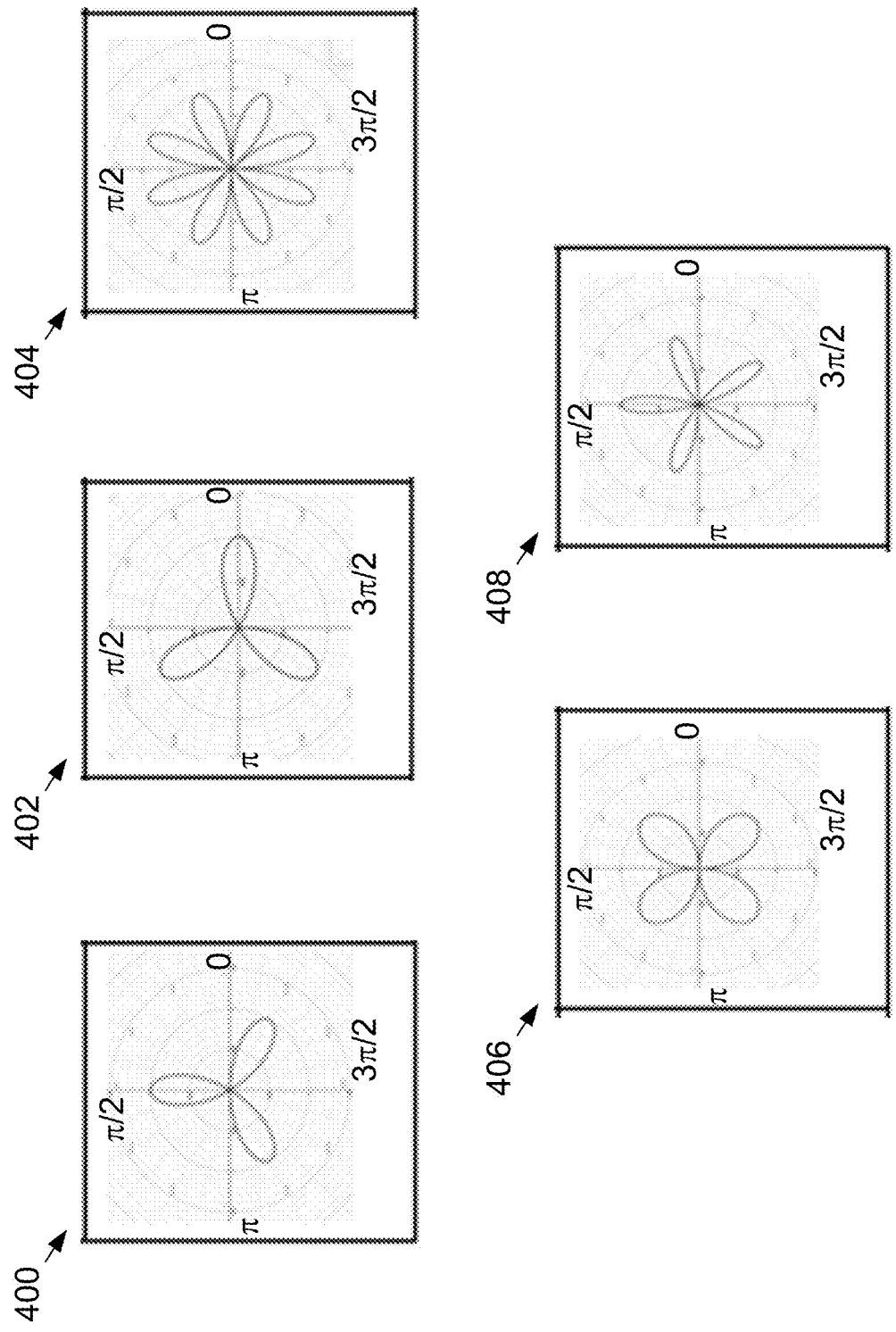
FIG. 4 depicts plots of some exemplary rose curves in accordance with the present disclosure.

FIG. 4 depicts plots of some exemplary rose curves in accordance with the present disclosure. Substituting exemplary values for A, B, and C in Equation (1) above results in curves 400, 402, 404, 406, and 408, where:

curve 400 is generated by the equation:

$$r = \cos\left(3\theta + \frac{\pi}{2}\right);$$

curve 402 is generated by the equation:

$$r = \sin\left(3\theta + \frac{\pi}{2}\right);$$

curve 404 is generated by the equation: $r=3 \sin(8\theta)$;
curve 406 is generated by the equation: $r=\sin(2\theta)$; and
curve 408 is generated by the equation: $r=\sin(5\theta)$.

Rhodonea Curves as Compared to Lissajous Curves:

A generic rose curve can also be expressed in parametric form:

$$x = A\cos(B\theta + C)\cdot\cos(\theta) \tag{2}$$

$$y = A\cos(B\theta + C) \cdot \sin(\theta) \quad (3)$$

At operation 203, a pair of drive frequencies is determined for each of drive signals DSX and DSY based on the resonances of tethers 112X and 112Y, respectively.

In the depicted example, since tethers 112X and 112Y have the same resonant characteristics, each of drive signals DSX and DSY includes frequencies F1 and F2. In some embodiments, tethers 112X are characterized by resonances R1X and R2X, while tethers 112Y are characterized by resonances R1Y and R2Y, which are different than R1X and R2X. In such embodiments, drive signal DSX includes frequencies F1X and F2X based on R1X and R2X, while drive signal DSY includes frequencies F1Y and F2Y based on F1X and F2X.

For microactuated scanning platforms, drive signals are typically provided mechanically (with different actuators for each frequency) or electronically (with one actuator providing both driving frequencies). As a result, it is useful to rewrite the equations using trigonometric product-to-sum rules:

$$x = \frac{A}{2}(\cos((B+1)\omega t + C) + \cos((B-1)\omega t + C)) \quad (4)$$

$$y = \frac{A}{2}(\sin((B+1)\omega t + C) - \sin((B-1)\omega t + C)) \quad (5)$$

Note that, in each of equations (4) and (5), the substitution θ→wt was made to emphasize that the Rose pattern is created by driving a scanning platform with harmonic drive signals on two resonance frequencies: $(B+1)\omega$ and $(B-1)\omega$.

Equations (4) and (5) are the basic Rose equations rewritten in a different form that shows that, by further generalization, a much wider set of curves than the set of basic Roses can be generated. When driving a 2D scanner the amplitude and phase of the four harmonics can be individually controlled; therefore, the equations can be generalized as:

$$x = \frac{A_1}{2}\cos((B+1)\omega t + C_1) + \frac{A_2}{2}\cos((B-1)\omega t + C_2) \quad (4a)$$

$$y = \frac{A_3}{2}\sin((B+1)\omega t + C_3) - \frac{A_4}{2}\sin((B-1)\omega t + C_4) \quad (5a)$$

The difference between equations (4) and (5) and equations (4a) and (5a) is only that both amplitude and phase have been allowed to be set independently for each harmonic. (It should be noted that equations (4a) and (5a) can be written in terms of only the cosine function because cos is transformed into sine with an appropriate phase shift. Likewise, they can be written in terms of only the sine function.) In the form of equations (4a) and (5a), it is clear that a much larger set of curves than the set of Roses described by equations (4) and (5) 5 can be generated. That larger set includes the set of Limacons. Both the set of Roses and the set of Limacons are subsets of the larger set generated by equations (4a) and (5a). For the purpose of this Specification, including the appended claims, the set of curves generated by equations (4a) and (5a) are referred to as "Generalized Rhodonea Patterns". It should also be noted that if a frequency offset, typically small, is added to one of the harmonics (i.e. ω→ω+Δω), then the generated patterns are not stationary, but rotate, which is beneficial for creating space-filling curves. For the purpose of this Specification, including the appended claims, these types of space-filling curves are referred to as "Generalized Dynamic Rhodonea Patterns".

In some embodiments, it is preferable that the resonances of tethers 112 have a ratio within the range of approximately 3 (B=2) to approximately zero (B→∞). In the depicted example, the ratio of R1 and R2 is substantially equal to two (i.e., B=3), which is used in the numerical examples below.

For comparison, the parametric equations for a Lissajous scan are given by:

$$x = A\cos(\omega_x t + C) \quad (6)$$

$$y = A\cos(\omega_y t + C) \quad (7)$$

It should be noted that the resonances of tethers 112X and 112Y can be different. If the ratio $\omega_x/\omega_y$ is far from unity, then the Lissajous scan is similar to a raster scan with one fast and one slow axis. It is preferable that a scan traces over most of the field of view in just a few cycles of the fundamental (lowest) frequency, so in this treatment, it is assumed that $\omega_x \approx \omega_y$.

At operation 204, light beam 118 is received at optical element 104.

At operation 205, drive signals DSX and DSY are provided to actuator 106 to induce it to scan stage 108, thereby enabling optical element 104 to redirect light beam 118 and form the desired pattern.

Figure 5:
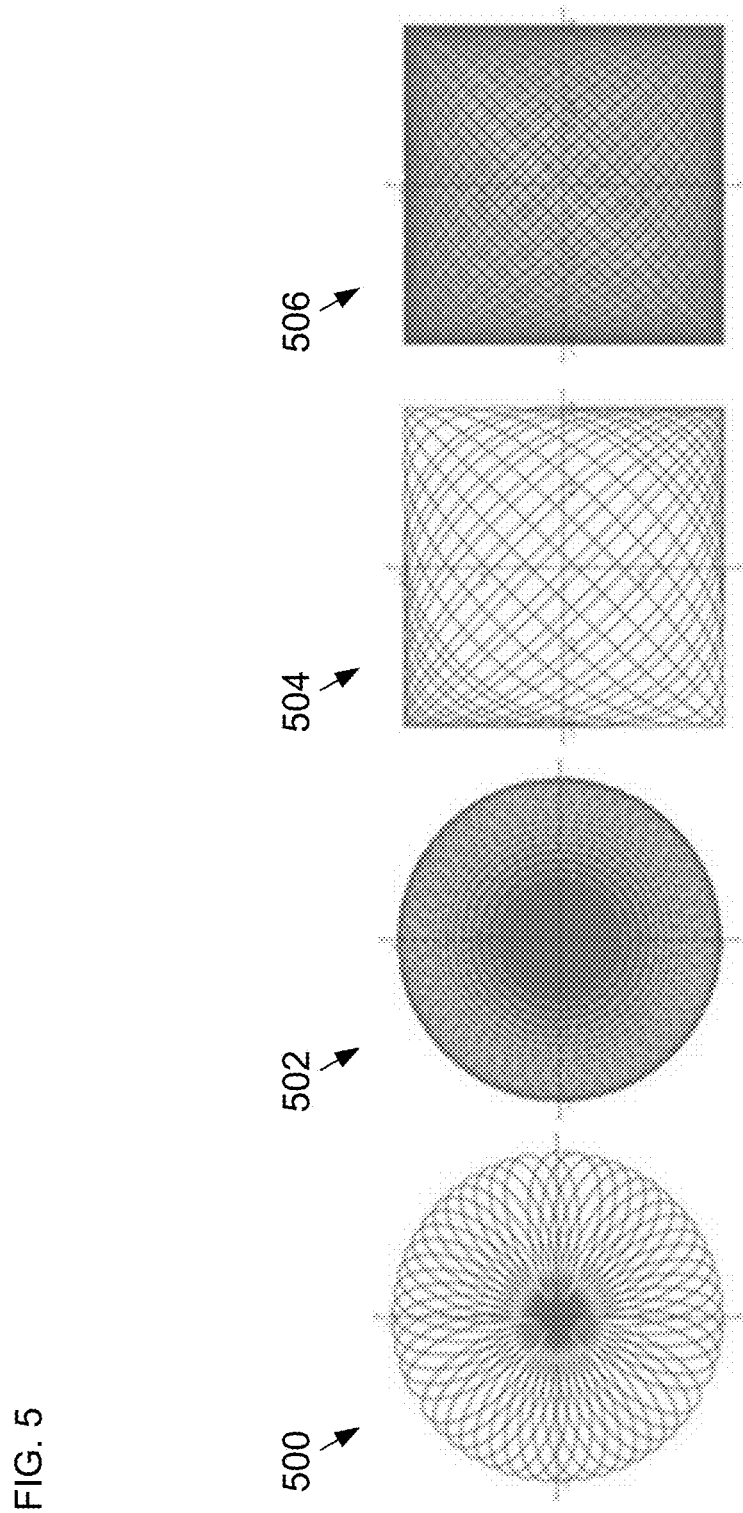
FIG. 5 depicts scan patterns of exemplary Rose and Lissajous patterns in accordance with the present disclosure.

FIG. 5 depicts scan patterns of exemplary Rose and Lissajous patterns in accordance with the present disclosure. The scan patterns depicted in plots 500 and 502 are Rose patterns generated using Equations (4) and (5), while plots 504 and 506 are generated using Equations (6) and (7). In each case, values of 1.0 for A and C=t/100 are used, where C represents a small phase chirp for improving pattern fill.

Pattern 500 is a Rose pattern that includes sixteen full loops of the Rose curve as generated by Equations (4) and (5) above, using A=1, B=3.1 and ω=1.0.

Pattern 502 is a Rose pattern that includes eighty full loops of the Rose curve as defined by Equations (4) and (5) above, using A=1, B=3.1 and ω=1.0.

Pattern 504 is a Lissajous pattern that includes sixteen full loops of the Lissajous curve as defined by Equations (6) and (7) above, using @x=1.05 and @y=1.05x/3.

Pattern 506 is a Lissajous pattern that includes eighty full loops of the Lissajous curve as defined by Equations (6) and (7) above, using $\omega_x$=1.05 and $\omega_y$=1.05π/3.

Plots 500, 502, 504, and 506 clearly show that there are dramatic differences between the Rose and Lissajous scan patterns. The Rose pattern has the advantage of being faster and more even fill, and most importantly for some applications, it samples most densely in the center of the FOV. It also has a circular (or elliptical in the general case) FOV. The Lissajous pattern requires more loops to achieve a similar fill to the Rose, and most problematic, it oversamples at the very edges and particularly the corners of the FOV. The biggest difference is therefore that while the Rose curve does not sample the corners of the FOV, the Lissajous curve spends most of its time there.

Oversampling the center of a region is particularly useful in dynamic imaging, including LIDAR, where the FOV changes significantly in the time that it takes to complete a full scan. By repeatedly going through the center of the FOV, the Rose pattern achieves a very rapid update of the pointing direction of the imaging system.

One-Dimensional Scanning with a Doubly Resonant Scanning Platform

While Rose and Lissajous scanning are well suited to scanning in two dimensions, one-dimensional scanning is also technologically important. In 1D scanning, the fill factor of a scan is less critical and both the Rose and the Lissajous patterns trace the full range of values. However, the Rose pattern advantageously oversamples at the center of a scan region, while the Lissajous oversamples at the edges (i.e., away from the center of the FOV).

Figure 6:
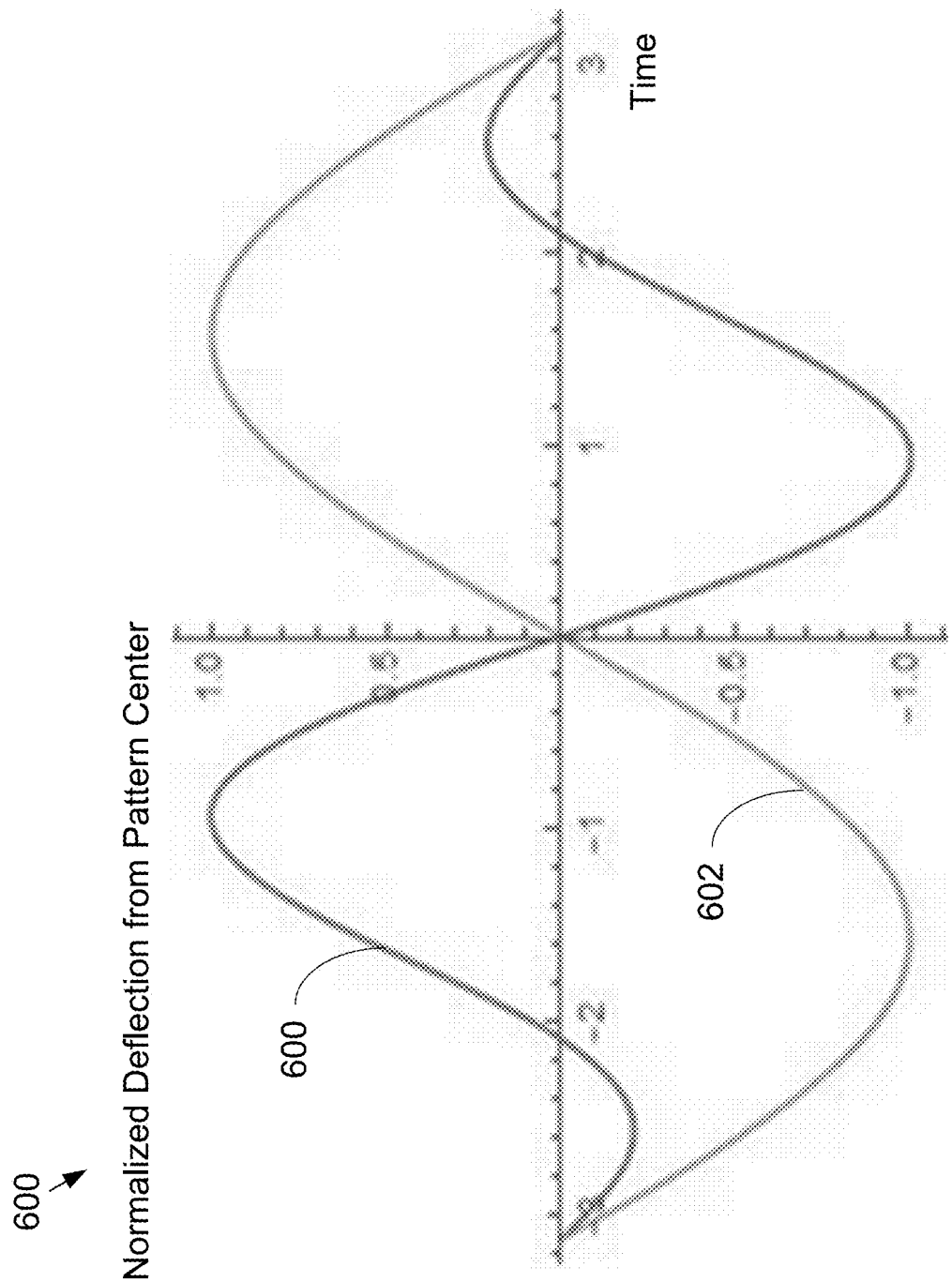
FIG. 6 depicts a plot of the distance from a central position over one scanning period for one-dimensional Rose and Lissajous scans generated using a doubly resonant beam scanner in accordance with the present disclosure.

FIG. 6 depicts a plot of the distance from a central position over one scanning period for one-dimensional Rose and Lissajous scans generated using a doubly resonant beam scanner in accordance with the present disclosure.

Plot 600 includes traces 602 and 604, where trace 602 is a 1D Rose curve, and trace 604 is a 1D Lissajous curve. It should be noted that the amplitudes of traces 602 and 604 were adjusted such that their maximum deflection was substantially the same (i.e., substantially normalized).

It is clear from plot 600 that, due to the slow turn-around of the harmonic function, the 1D Lissajous spends most of the time during each period at the extreme edges of the scan range. In contrast, the Rose pattern, due to its higher frequency content, turns around faster at the edges and spend significantly more time in the vicinity of the zero position.

It should be noted that the parametric equations for Lissajous scans (i.e., Equations (6) and (7)) is a subset of the equations for Rose scans (i.e., Equations (4) and (5)). By statically or dynamically modulating the parameters of the Rose scan equations, therefore, it is possible to generate modified Rose scans, modified Lissajous scans, and combinations of Rose and Lissajous without departing from the scope of the present disclosure. There are an infinite number of combinations and modifications that can be made, thereby enabling a substantially optimized solution for a given application.

Figure 7:
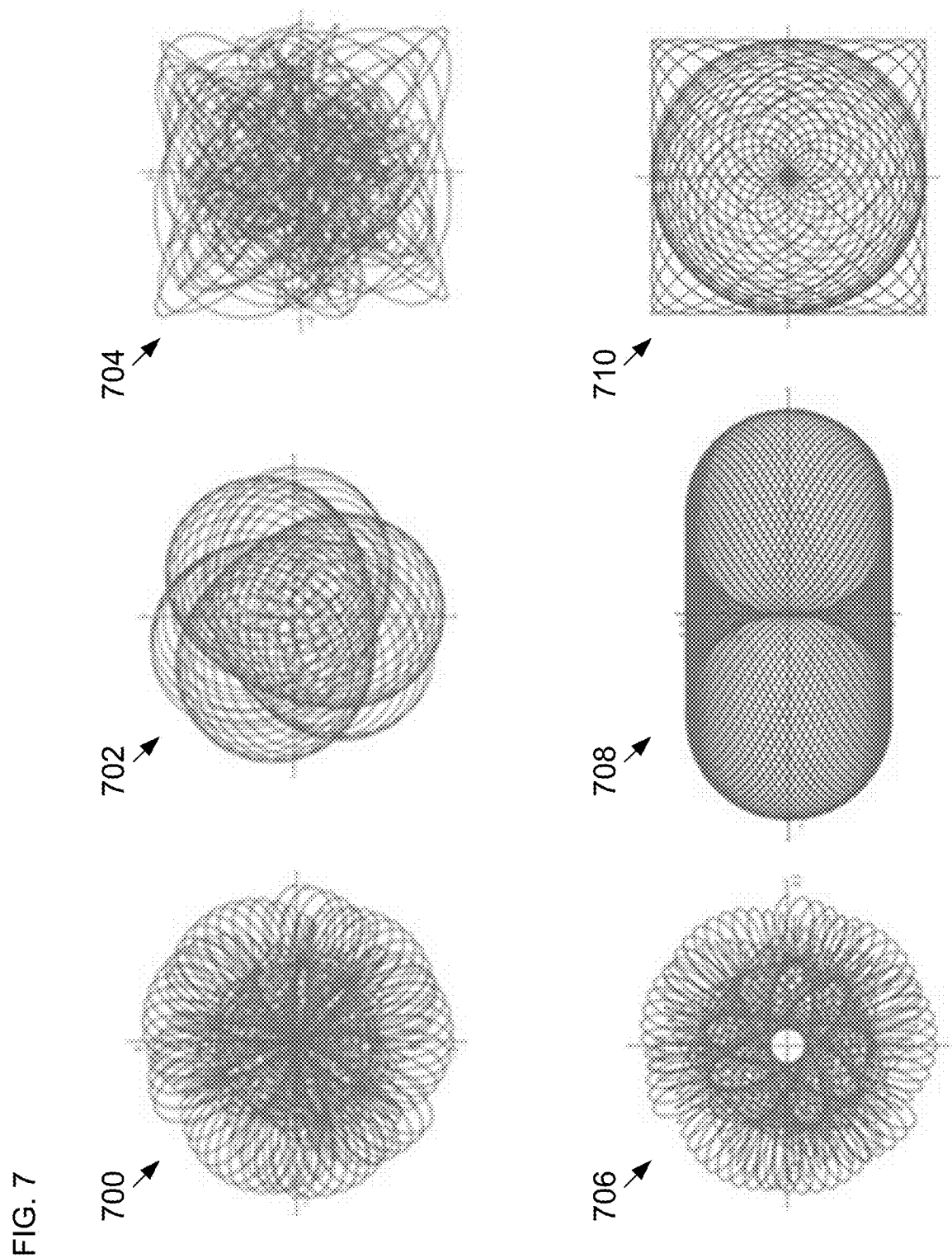
FIG. 7 depicts exemplary adjusted and combined scans possible using a doubly resonant beam scanner in accordance with the present disclosure.

FIG. 7 depicts exemplary adjusted and combined scans possible using a doubly resonant beam scanner in accordance with the present disclosure. Patterns 700 through 710 illustrate some of the variety of patterns that can be generated in accordance with the present disclosure, as well as the flexibility of the methods described herein.

Patterns 700 and 702 are Rose patterns that include sixty-four and thirty-two full loops of the Rose curve, respectively, as generated by Equations (4) and (5) above, using B=3.1 and ω=1.0, as well as an amplitude that is modulated at half the fundamental frequency.

Pattern 704 is analogous to pattern 700; however, pattern 704 is generated using a 10% difference in the fundamental frequencies of the x- and y-axes.

Pattern 706 is also analogous to pattern 700; however, pattern 706 is generated using a 20% reduction in the amplitude of the relatively higher frequency in the drive signals. As evinced by pattern 706, such a configuration gives rise to a "doughnut shaped" scan pattern.

Pattern 708 is sixty-four full loops of a 1D Rose pattern in the horizontal direction (using a value of 3.05 for B) combined with a 1D Lissajous (harmonic) pattern in the vertical direction.

Pattern 710 is thirty-two loops of a Rose pattern (B=3.1) combined with thirty-two loops of Lissajous with a 5% difference between its two frequencies.

It should be noted that patterns 700 through 706 demonstrate that by modifying a Rose pattern, fill factor can be adjusted throughout the FOV. Such patterns are merely representative of myriad analogous patterns that, individually or in combination, can be generated by adjusting electronically the amplitudes, frequencies, and phases of drive signals DSX and DSY.

In similar fashion, patterns 708 and 710 demonstrate just a few examples of myriad combinations of Rose and Lissajous scans that can be realized in accordance with the present disclosure. For example, pattern 708 is realized by combining a 1D Rose on the horizontal axis and a 1D Lissajous (which is substantially just a harmonic function) on the vertical axis, while in pattern 710 the combination is sequential. Specifically, in the first half of the scan that generates pattern 710, a Rose is drawn followed by generation of a Lissajous pattern in the second half of the scan, thereby combining advantageous characteristics of both of the Rose and Lissajous patterns.

Note that, when the frequencies are the same for DSX and DSY, a perfect Rose pattern is formed. However, non-perfect Rose patterns (such as patterns 700 through 710) have utility in many applications and can be generated using drive signals that deviate from this symmetry without departing from the scope of the present disclosure.

As discussed above, the Rose pattern has many advantages compared to the Lissajous pattern; however, beam scanners capable of producing Rose patterns are significantly more complex than those designed for Lissajous scanning. The additional complexity is readily appreciated by comparing the two set of governing equations (i.e., Equations (4) and (5) versus Equations (6) and (7)). For Lissajous patterns, it is sufficient to have a single resonance in each direction of the desired scanning mode, while the Rose pattern requires two resonances of each scanning mode. Moreover, it is desirable that the resonance frequencies of a Rose-pattern beam scanner have a specific ratio. In the depicted examples provided herein, that ratio is approximately 2, to create a stationary or rotating three-petal Rose as described above.

In the depicted example, beam scanner 100 is configured such that it has degenerate resonances on two orthogonal axes, where R1 is approximately 68 Hz and R2 is approximately 136 Hz for the two scanning modes on each axis.

In operation, electromagnets 116 are driven using driving conditions to create resonances strong enough to create significant angular scanning of mirror 104.

When each axis is driven on its first order scanning resonance, light beam 118 is scanned by beam scanner 100 in a Lissajous pattern centered on central axis CA. In some cases, a slight frequency offset is applied to one or both drive signals.

When each axis is driven on both its first order scanning resonance and its higher order resonance, in some cases with slight frequency offsets, light beam 118 is scanned in a Rose or Rose-like pattern.

Figure 8:
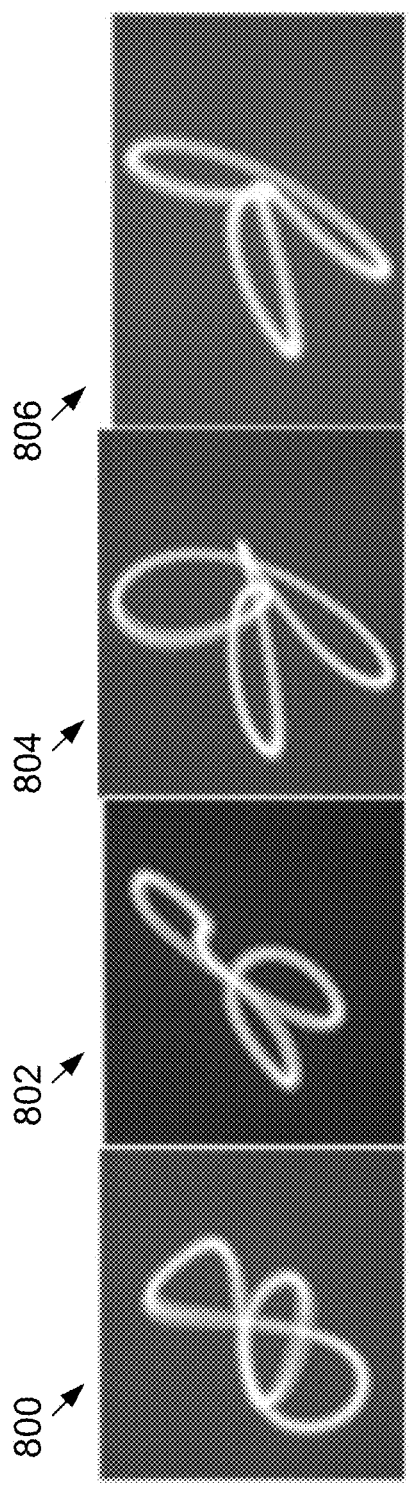
FIG. 8 depicts exemplary scanning patterns realized by driving each axis of beam scanner 100 with a drive signal having frequencies that are substantially matched to the two first-order scanning resonances of the axis.

FIG. 8 depicts exemplary scanning patterns realized by driving each axis of beam scanner 100 with a drive signal having frequencies that are substantially matched to the two first-order scanning resonances of the axis.

Patterns 800 through 806 are distorted Rose patterns generated using drive signals having resonance frequencies of 68 Hz and 136 Hz. The differences in patterns 800 through 806 are realized by changing the drive currents in drive signals DSX and DSY slightly.

Figure 9:
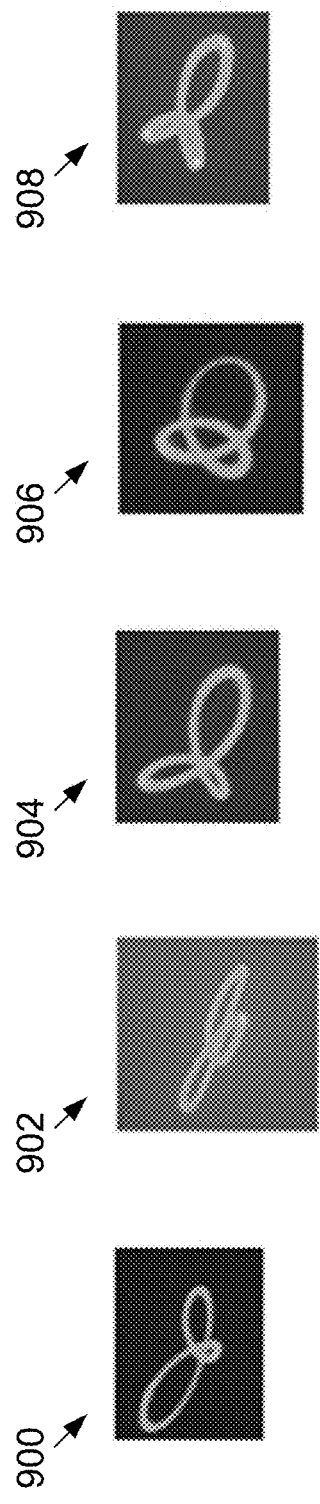
FIG. 9 depicts exemplary scanning patterns realized by driving each axis of beam scanner 100 with a drive signal having frequencies that are slightly mismatched with the two first-order scanning resonances of the axis.

FIG. 9 depicts exemplary scanning patterns realized by driving each axis of beam scanner 100 with a drive signal having frequencies that are slightly mismatched with the two first-order scanning resonances of the axis.

Patterns 900 through 908 are generated using drive signals having frequencies that are slightly offset from resonances R1 and R2 (i.e., 68 Hz and 136 Hz, respectively) of each axis of the beam scanner. The differences in patterns 900 through 908 are realized by changing the drive currents provided to electromagnets 116X and 116Y slightly.

It should be noted that the observed patterns of patterns 800-806 and 900-908 follow the general path of a rose, but are distorted. The distortion arises due to fabrication variation, such as asymmetries in the structure of scanning platform 102, slight differences in the positions and strengths of the electromagnets, and the like, which can give rise to cross talk between the different mechanical modes of the beam scanner.

It is an aspect of the present disclosure that doubly resonant beam scanners are operative for generating polar curves other than Rose and Lissajous patterns, such as Lemniscates, Limaçons, other more-complex patterns, and the like. The results provided above demonstrate that a doubly resonant scanning system is capable of generating a wide variety of scanning patterns, each of which having a corresponding set of advantages and uses. Of particular interest are combinations of Rose and Lissajous patterns because of the complementary nature of these two scanning patterns—notably, a Rose pattern oversamples in the center of a FOV, while the Lissajous pattern oversamples the edges and corners of a FOV. As a result, improved sampling coverage is realized by combining these two patterns.

Each of the patterns depicted in FIGS. 8 and 9 is substantially stationary due to the fact that the drive-signal frequency ratio is exactly 2 on each axis. It is yet another aspect of the present disclosure, however, that by slightly changing one of the frequencies of the drive signal provided to one axis by the same amount (for example, 0.1 Hz), the generated pattern will precess (i.e., rotate) and become distorted such that the pattern moves through a sequence of Rose-like curves, returning to the original shape just as the Rose completes a full rotation. By changing the frequency in the opposite direction, the rotation of the pattern is reversed such that it goes through the sequence in reverse order. Finally, the rate of the rotation of the pattern is dependent upon the magnitude of the frequency offset. In many applications, a rotating Rose curve that fills a FOV is a highly desirable scan pattern.

As disclosed herein, it is possible to create Rhodonea, or Rose, curves using doubly resonant scanning platform that scans in two dimensions in accordance with the present disclosure. Furthermore, both stationary and rotating patterns can be realized.

As noted above, the ratio of the two resonance frequencies of drive signals DSX and DSY determines the scan pattern beam scanner 100 generates. As a result, the choice of resonance frequency ratio is a function of the application for which the scanning mirror is intended, which typically dictates the requirements on the patterns and dynamics (e.g., stationary or rotating pattern, and the like).

In order for a beam scanner to generate a Rose or Rose-variation scan pattern, each axis of the beam scanner must be driven with a drive signal that includes two frequencies. In the preceding we have focused on drive signals having two frequencies that are both equal to a resonant frequency of the axis being driven (i.e., "on resonance"). However, drive signals having one frequency that is on resonance and one frequency that is off resonance, or both frequencies off resonance, can be used without departing from the scope of the present disclosure.

Although beam scanner 100 includes a mirror for directing optical signal 118, it will be clear to one skilled in the art, after reading this Specification, how to specify, make, and use alternative embodiments that comprise an optical element other than a mirror, such as a prism, a diffractive element, a refractive lens, a hologram, and the like.

Figure 10:
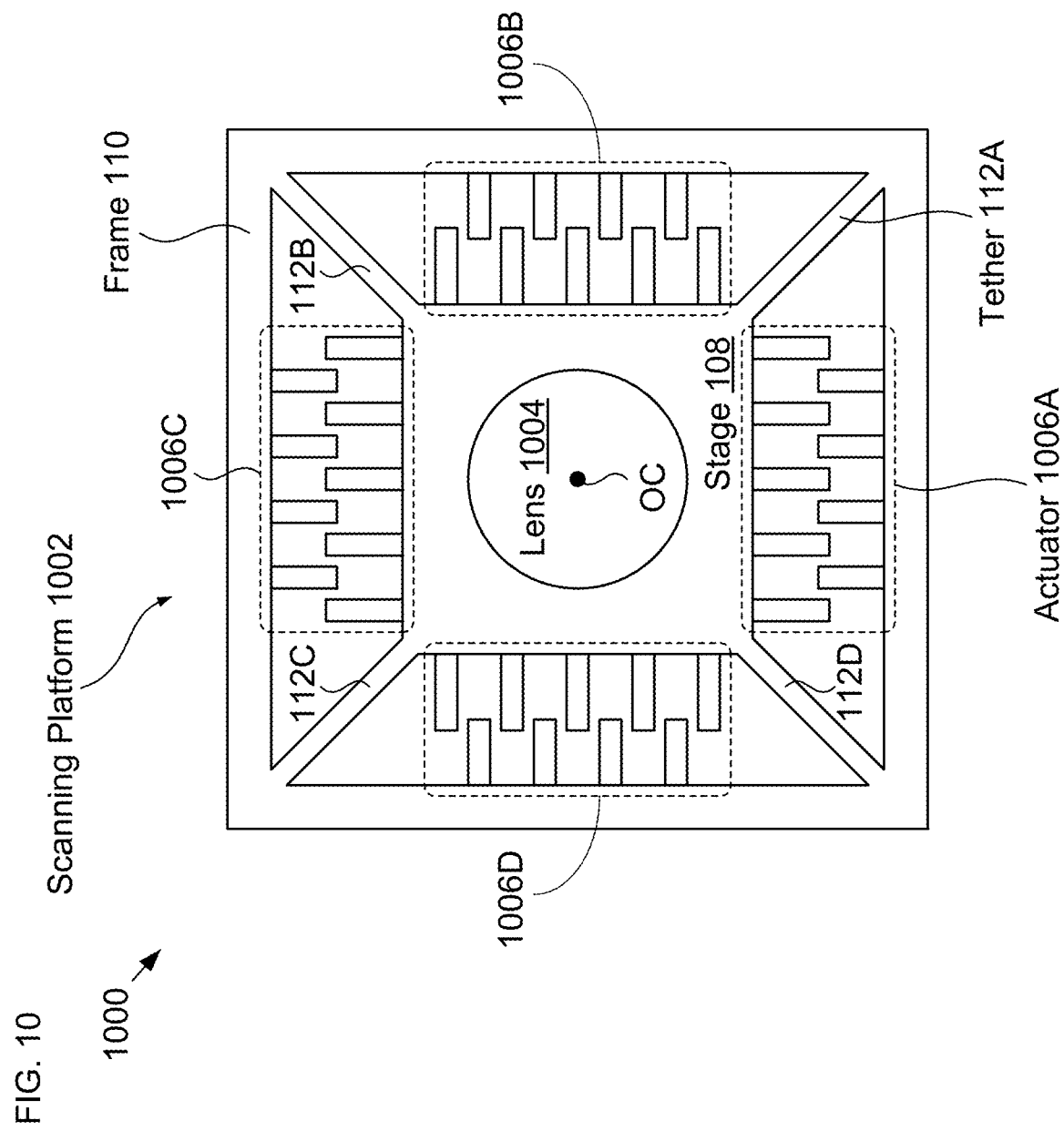
FIG. 10 depicts a schematic drawing of an alternative embodiment of a beam scanner in accordance with the present disclosure.

FIG. 10 depicts a schematic drawing of an alternative embodiment of a beam scanner in accordance with the present disclosure. Beam scanner 1000 includes scanning platform 1002, lens 1004, tethers 112A through 112D, and actuators 1006A-D. Beam scanner 1000 dictates the propagation direction of light beam 118 by controlling the position of the light beam relative to the optical center, OC, of lens 1004 via in-plane two-dimensional scanning platform 1002.

Scanning platform 1002 is analogous to scanning platform 102 described above; however, scanning platform 1002 imparts in-plane translation of an optical element (i.e., lens 1004) rather than rotating the optical element about a pair of orthogonal axes. In some embodiments, scanning platform 1002 is configured to impart an in-plane rotation of an optical element.

Lens 1004 is a conventional plano-convex lens that is disposed on movable stage 108 of scanning platform 1002.

Stage 108 is supported above a substrate (not shown) via tethers 112A through 112D. Each of tethers 112A-D is analogous to tethers 112 described above.

Each of actuators 1006A through 1006D is a conventional comb-drive actuator that is configured to impart an in-plane motion on stage 108 by drawing its respective comb fingers into one another. It should be noted that any suitable in-plane actuator can be used in beam scanner 1000 without departing from the scope of the present disclosure. Actuators suitable for use in accordance with the present disclosure include, without limitation, electromagnetic, piezoelectric, thermal, phase transition, and electrowetting actuators.

As will be apparent to one skilled in the art, the propagation direction of a light beam passing through lens 1004 is dependent upon the distance of that light beam from optical center OC. As a result, the propagation direction is controlled by actuators 1006A through 1006D.

As noted above, beam scanners in accordance with the present disclosure are well suited for use in optical systems such as Light Detection and Ranging (LIDAR) systems, heads-up displays, and the like.

Figure 11:
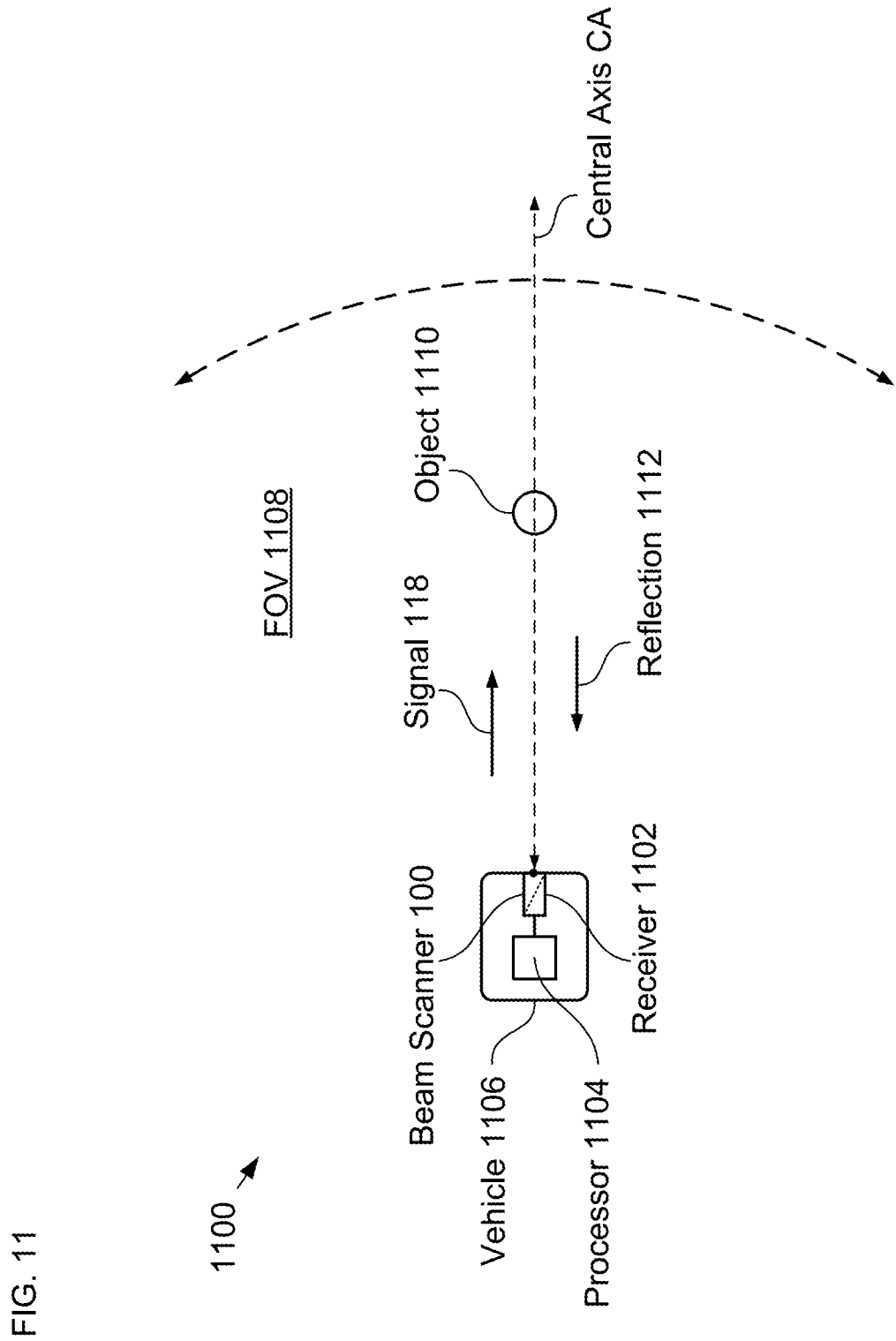
FIG. 11 depicts a schematic drawing of a representative optical system comprising a beam scanner in accordance with the present disclosure.

FIG. 11 depicts a schematic drawing of a representative optical system comprising a beam scanner in accordance with the present disclosure. LiDAR system 1100 includes beam scanner 100, receiver 1104, and processor 1104, all of which are mounted on vehicle 1106.

In operation, beam scanner 100 scans light beam 118 in a two-dimensional pattern to interrogate field-of-view 1108. In the depicted example, the pattern is a two-dimensional Rose pattern, as discussed above.

When light beam 118 is incident on an object within FOV 1108, such as object 1110, a portion of the light beam is reflected by the object toward receiver 1102 as reflection 1112.

Reflection 1112 is detected by receiver 1102, which provides an output signal to processor 1104.

Processor 1104 then develops a "point cloud" that is representative of all of the objects within FOV 1108 that gave rise to reflections during a given period of time.

As will be apparent to one skilled in the art, after reading this Specification, LiDAR system 1100 is merely one non-limiting example of a macro system in which a beam scanner in accordance with the present disclosure can be used.

It is to be understood that the disclosure teaches just some examples of embodiments in accordance with the present disclosure and that many variations can easily be devised by those skilled in the art after reading this disclosure without departing from its scope and, furthermore, that the scope of the present invention is to be determined by the following claims.

What is claimed is:

1. An apparatus comprising a beam scanner (100) for steering a light beam (118) in a pattern (400 or 600), wherein the beam scanner includes:
   first and second tethers (112X) that are doubly resonant;
   a stage (108) that is mechanically coupled between the first and second tethers; and
   an optical element (104) configured to direct the light beam, wherein the optical element is mechanically coupled with the stage;
   wherein the first and second tethers collectively enable a first motion of the stage, the first motion being selected from the group consisting of a rotation about a first axis (x axis) and a translation along a second axis (y axis) that is orthogonal to the first axis.

2. The apparatus of claim 1 wherein the beam scanner further includes:
   third and fourth tethers (112Y) that are doubly resonant, the stage being mechanically coupled between the third and fourth tethers;
   wherein the third and fourth tethers collectively enable a second motion of the stage, and wherein the second motion is selected from the group consisting of a rotation about the second axis and a translation along the first axis.

3. The apparatus of claim 1 wherein the beam scanner further includes an actuator (106) configured to induce the first motion, the actuator being selected from the group consisting of a parallel-plate electrostatic actuator, a comb drive electrostatic actuator, a piezoelectric actuator, a magnetic actuator, a thermal actuator, a phase-transition actuator, and an electrowetting actuator.

4. The apparatus of claim 1 wherein the pattern has at least one dimension and is selected from the group consisting of a generalized dynamic Rhodonea pattern, a combined generalized dynamic Rhodonea and Lissajous pattern, and a non-Lissajous pattern.

5. The apparatus of claim 1 wherein the beam scanner is configured to steer the light beam to scan a field of view having a shape selected from the group consisting of circular and elliptical.

6. The apparatus of claim 1 wherein the beam scanner is configured to control the density of the pattern.

7. The apparatus of claim 1 wherein the beam scanner comprises a micro-electromechanical-systems-based (MEMS-based) scanning platform (102) that includes the stage and the first and second tethers.

8. The apparatus of claim 1 wherein the optical element is selected from the group consisting of a mirror, a diffractive element, a hologram, a prism, and a refractive lens.

9. The apparatus of claim 1 wherein the apparatus is selected from the group consisting of a LiDAR system and a heads-up display.

10. A method for steering a light beam (118) in a pattern (400 or 600), the method comprising:
    providing a beam scanner (100) that includes;
    (i) first and second tethers (112X) that are doubly resonant such that they are characterized by a first pair of resonances (R1X and R2X);
    (ii) a stage (108) that is mechanically coupled between the first and second tethers;
    (iii) an optical element (104) that is configured to direct the light beam, wherein the optical element is mechanically coupled with the stage; and
    (iv) an actuator that is configured to impart a first motion on the scanning platform, wherein the first motion is selected from the group consisting of a rotation about a first axis (x axis) and a translation along a second axis (y axis);
    establishing a first pair of frequencies (F1X and F2X) that are based on the first pair of resonances;
    driving the actuator with a first drive signal (DSX) that includes the first pair of frequencies; and
    receiving the light beam at the optical element.

11. The method of claim 10 wherein the beam scanner is provided such that it further includes third and fourth tethers (112Y) that are doubly resonant such that they are characterized by a second pair of resonances (R1Y and R2Y), the stage being mechanically coupled between the third and fourth tethers, and wherein the method further includes:
    establishing a second pair of frequencies (F1Y and F2Y) that are based on the second pair of resonances; and
    driving the actuator with a second drive signal (DSY) that includes the second pair of frequencies.

12. The method of claim 10 further comprising steering the light beam such that the pattern has at least one dimension and is selected from the group consisting of a generalized dynamic Rhodonea pattern, a combined generalized dynamic Rhodonea and Lissajous pattern, and a non-Lissajous pattern.

13. The method of claim 12 wherein the light beam is steered to scan a field of view having a shape selected from the group consisting of circular and elliptical.

14. The method of claim 10 further comprising controlling the density of the pattern.

15. The method of claim 10 wherein the beam scanner is provided such that it includes a scanning platform (102) formed via a process selected from the group consisting of MEMS-based fabrication and three-dimensional (3D) printing, the scanning platform including the stage and the first and second tethers.

* * * * *